United States Patent [19]
Cangiano et al.

[11] Patent Number: 5,908,502
[45] Date of Patent: Jun. 1, 1999

[54] LIMESTONE FILLED PORTLAND CEMENTS

[75] Inventors: Stefano Cangiano, Torre De Roveri; Gianmario Frigeni, Bergamo; Luigi Cassar, San Donato Milanese; Giampietro Tognon, Bergamo, all of Italy

[73] Assignee: Italcementi S.p.A., Bergamo, Italy

[21] Appl. No.: 08/808,458

[22] Filed: Feb. 28, 1997

[30] Foreign Application Priority Data

Mar. 1, 1996 [IT] Italy ................. MI96A0398

[51] Int. Cl.$^6$ ............... C04B 14/28; C04B 7/52
[52] U.S. Cl. .............. 106/738; 106/735; 106/816; 106/817
[58] Field of Search .............. 106/738, 816, 106/817, 735

[56] References Cited

U.S. PATENT DOCUMENTS

| | | | |
|---|---|---|---|
| 4,026,716 | 5/1977 | Urschel, III et al. | 106/738 |
| 4,354,877 | 10/1982 | Kawano et al. | 106/738 |
| 4,375,987 | 3/1983 | Lange et al. | 106/664 |
| 4,405,372 | 9/1983 | Serafin et al. | 106/728 |
| 4,773,934 | 9/1988 | Colin | 106/738 |
| 5,260,041 | 11/1993 | Cohen et al. | 106/817 |

FOREIGN PATENT DOCUMENTS

| | | | |
|---|---|---|---|
| 639460 | 4/1962 | Canada | 106/738 |
| 0715892 | 6/1996 | European Pat. Off. . | |
| 2406614 | 5/1979 | France . | |
| 822966 | 11/1951 | Germany . | |
| 31 38 342 | 4/1983 | Germany . | |
| 38 34 494 | 4/1990 | Germany . | |
| 60-180944 | 9/1985 | Japan | 106/816 |
| 968794 | 9/1964 | United Kingdom . | |
| 1160569 | 8/1969 | United Kingdom | 106/816 |

OTHER PUBLICATIONS

Chemical Abstract No. 113:64314 which is an abstract of Japanese Patent Specification No. 02–102162 (Apr. 1990).
Chemical Abstract No. 125:255351 which is an abstract of Japanese Patent Specification No. 08–208285 (Aug. 1996).
JAPIO Abstract No. JP407277785A which is an abstract of Japanese Patent Specification No. 07–277785 (Oct. 1995).
JAPIO Abstract No. JP407267697A which is an abstract of Japanese Patent Specification No. 07–267697 (Oct. 1995).
S. Tsivilis et al., "Upgrading of a T.T.P. Mill—Application to Selective Clinker Grinding." Chem. Abs., vol. 121, No. 12, Sep. 19, 1994.
"Mahlung und Eigenschaften von Zementen mit mehreren Hauptbestandteilen", Schiller et al., ZKG International, vol. 45, No. 7. pp. 325–334, Jul.1992.
"Korngrössenverteilung and Eigenschaften von Zement; Teil III: Einflüsse des Mahlprozesses", Ellerbrock et al., ZKG International, vol. 43, No. 1, pp. 13–19, Jan. 1990.
"Effect of limestone on the grinding of PC [portland cement] clinker and the properties of cement motar", Glasnovic et al., Chemical Abstracts, abstract No. 89243j, vol. 106, No. 12, p. 297, Mar. 1987.
P. Krstulovie et al. *"A New Approach in Evaluation of Filler Effect in Cement II the Effect of Filler Fineness and Blending Procedure"* 1994 pp. 931–396.
Performance of Limestone–Filled Cements, pp. 1–9 (No Date).
Influencia Del Filler Calizo En Las Propiedades De Los Motteros A Resistencia Constante Francisco Hernandez et al. pp. 39–43 (02/1994).
Von S. Sprung et al. *Beurteilung Der Eignung Von Kalkstein Zur Herstelling Von Portlandkalksteinzement* (PKZ) pp. 1–19 (Jan. 1991).

*Primary Examiner*—Anthony Green
*Attorney, Agent, or Firm*—McDermott, Will & Emery

[57] ABSTRACT

Limestone filled Portland cement wherein the fineness of limestone particles ranges from 5,000 to 12,000 Blaine and the fineness of clinker particles ranges from 1,500 to 3,000 Blaine.

7 Claims, 1 Drawing Sheet

LIMESTONE FILLED PORTLAND CEMENTS

FIELD OF THE INVENTION

The present invention relates to limestone filled Portland cements characterized by an optimal particle size and to the process for the preparation of same.

STATE OF THE ART

Cement is a hydraulic binder, i.e. a finely divided inorganic powder that, in admixture with water, forms a paste which cohagulates and hardens by hydration, and once hardened, it maintains its resistance also under water. As a hydraulic binder it must produce mortar or concrete capable of maintaining the necessary flow as long as required to reach, after given periods of time, predetermined mechanical resistance levels, and be endowed with a long-term stability in terms of volume.

A major hydraulic constituent of cement is clinker, which consists of calcium silicates (at least two thirds by wt.), the remainder being aluminium oxide, iron oxide and other oxides.

In compliance with UNI ENV 197.1 standard, limestone filled Portland cements (type II) are hydraulic binders containing clinker (65 to 94% by wt.), limestone (6 to 35% by wt.) and minor constituents (0 to 5% by wt.), said minor constituents being selected from blast furnace slag, microsilica, pozzolana, flying ashes, calcined shales or mixtures thereof.

The above percent amounts are exclusive of calcium sulphate, used to regulate the setting time, and optional additives.

UNI ENV 197.1 standard covers types of cement, with requirements for compressive strengths that, depending on the various cement classes, vary from 32.5 $N/mm^2$ to 52 $N/mm^2$, at 28 days.

It follows that both cements consisting exclusively of clinker and gypsum and the so-called mixed cements, like those filled with cements, have to possess mechanical properties complying with standards.

However, as shown from the data reported in the literature, the addition of a calcareous filler brings about a more or less marked reduction in the mechanical resistance properties of cement in standard mortar, if compared with those of Portland cement without filler (type I as per UNI ENV 197.1).

P. Krustolovic et al. (CCR, vol. 24, No. 5, 1994) state that the addition of 20% non-hydraulic filler reduces the compressive strength of mortar and concrete by 27%.

P. Livesey, in *Performance of limestone filled cement*, p. 6.1, confirms said results and states that the addition of 5% max. of calcareous filler does not affect the cement resistance, whereas the addition of 25% limestone causes a reduction in the mechanical resistance by 25%.

As disclosed in *Materiales de construccction*, vol. 24, No. 233, 1944, the addition of 10% max. of calcareous filler would not affect the mechanical resistance properties of standard mortar. However, should the amount of calcareous filler be as high as 15%, the resistance will fall by 27% and only by decreasing the water/cement ratio, the resistance properties may be kept constant.

S. Sprung and E. Siebel (*Zement Kalk Gips*, No. 1, pp. 1–11, 1991) maintain that, with calcareous filler contents ranging from 5% to 10%, the increased compactness of the cementitious paste structure caused by intragranular holes filling may bring about a slight increase in the standard resistance properties. With higher calcareous filler contents, the diluting effect produced by the filler on the clinker causes a reduction in the resistance of cement in standard mortar. Said authors state that, should a Portland cement be added with a calcareous filler in amounts of 15%, the standard mortar resistance will be reduced by 14%.

To obviate said inconvenience, Sprung and Siebel state that Portland cements filled with 20% to 30% limestone can have a mechanical resistance of 45 $N/mm^2$ only if prepared with clinker having fineness as high as 4,500 to 5,000 Blaine.

The commercial-scale production of clinker with such a high degree of fineness requires long grinding times and high power consumption.

THE PRESENT INVENTION

The Applicant has surprisingly been found that Portland cement containing 6% to 35% limestone, having mechanical properties as high as and, in some cases, better than those of Portland cement without inorganic filler, may be obtained with clinker having fineness even as low as 1,500 to 3,000 Blaine.

It is a characteristic of the claimed limestone filled Portland cement that the limestone particles fineness ranges from 5,000 to 12,000 $cm^2/g$ (Blaine) and the clinker particles fineness ranges from 1,500 to 3,000 Blaine.

In fact, it has been found that, when the clinker and limestone particles satisfy the aforementioned conditions, the mechanical properties of said mixed cement are substantially the same as and sometimes even better than those of Portland cement without filler.

It is a further object of the present invention to provide a process for the preparation of the limestone filled Portland cement according to the present invention, comprising a separate grinding of clinker and limestone, followed by homogenization.

In fact, it has been found that the process of the invention envisaging a separate grinding of clinker and limestone is highly energy saving in respect of the processes encompassing a co-grinding of said components.

DETAILED DESCRIPTION OF THE INVENTION

Figure 1:
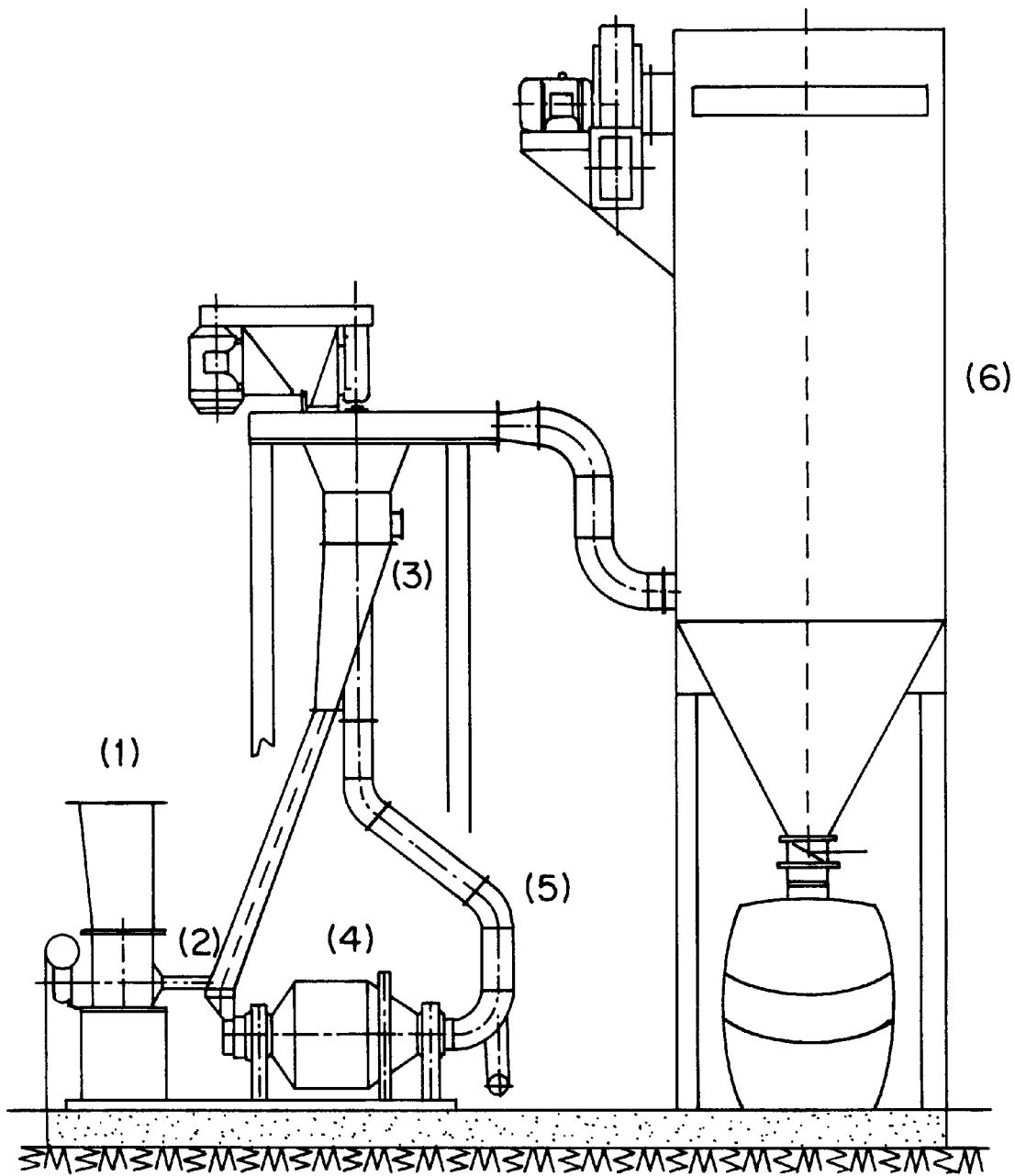
FIG. 1 shows the plant wherein grinding of the components of the present invention takes place.

As already pointed out, in the limestone filled Portland cement according to the present invention, the fineness of the clinker (ground with gypsum) ranges from 1,500 to 3,000 Blaine, preferably from 1,600 to 2,500 Blaine. In fact, it has been found that, should a clinker with fineness above 3,000 Blaine be used in combination with a limestone having particle size ranging from 5,000 to 12,000 Blaine, the mechanical properties of the resulting cement become somehow, though limitedly, worse.

The clinker particle size distribution preferably ranges from 0 to 80 $\mu$m or, even better, from 10 to 40 $\mu$m.

In a particularly preferred embodiment of the invention, the clinker has fineness ranging from 1,600 to 2,800 Blaine, 40 $\mu$m maximum nominal diameter, and does not contain any fraction of fine particles ranging from 0 to 10 $\mu$m.

The fineness of the limestone of the invention ranges from 5,000 to 12,000 Blaine, preferably from 6,000 to 10,000 Blaine.

At fineness values above 10,000 Blaine, the effect of the filler becomes less evident and at values above 12,000 Blaine the economic pros due to higher resistance properties reduce in respect of the economic cons due to higher energy consumption for grinding. The average diameter of limestone particles ranges from 10 to 30 μm and preferably is not higher than 15 μm.

The limestone to be used according to the present invention has to comply with UNI ENV 197.1 standard, i.e. have a $CaCO_3$ content ≧75% by wt., a methylene blue adsorption ≦1.20 g/100 g and an organic matter content ≦0.50% by wt.

The limestone content in the cement ranges from 6% to 35% by wt., preferably from 20% to 25% by wt. in respect of the cement, excluding gypsum and additives.

The best results are obtained with clinker fineness ranging from 1,600 to 1,700 Blaine, limestone fineness of 10,000 Blaine and with a distribution of the clinker particle size ranging from 10 to 40 μm.

In the process for the preparation of Portland cement according to the present invention, clinker and limestone grinding takes place separately, preferably in a closed-circuit grinding mill essentially consisting of a hopper, a ball mill, an air classifier and a bag filter, as follows:

i) the product to be ground is fed to a ball mill from a hopper;
ii) the ground product goes through a vibrating pipeline to an air classifier, where the fraction of the desired fineness is separated from the coarser fraction, which is returned to the ball mill through a pipeline;
iii) the product having the desired fineness and particle size is filtered through a bag filter and collected.

The resulting components are homogenized by any mixer known in the art. With a view to optimizing energy consumption, the constituents, before being subjected to separate grinding, may be conveniently crushed, e.g. in a jaw-type crusher.

FIG. 1 shows a scheme of the grinding plant wherein grinding as per the above process is carried out.

In particular in this figure: (1) is the hopper, (2) the recycle vibrating pipeline, (3) the air classifier, (4) the ball mill, (5) the pipeline wherethrough the particles from ball mill (4) enter air classifier (3), (6) the bag filter.

The following examples illustrating the preparation of the claimed limestone filled cement and the relevant physico-mechanical properties are conveyed by way of indication, not of limitation, of the present invention.

EXAMPLE 1

Limestone and clinker, premixed with gypsum in a ratio of 5% by weight, were separately crushed in a jaw-type crusher.

The particle size of the crushed materials is shown in Table 1.

TABLE 1

Clinker and limestone particle size after crushing

| Clinker/gypsum | | Limestone | |
| --- | --- | --- | --- |
| ø [mm] | Residue | ø [mm] | Residue |
| 10 | — | 4 | 12 |
| 4 | 30.5 | 2.8 | 23.7 |
| 2.8 | 58 | 1.5 | 34.6 |
| 1.5 | 80 | 1 | 38.3 |

TABLE 1-continued

Clinker and limestone particle size after crushing

| Clinker/gypsum | | Limestone | |
| --- | --- | --- | --- |
| ø [mm] | Residue | ø [mm] | Residue |
| 1 | 86.2 | 0.5 | 43.9 |
| 0.5 | 91.2 | 0.3 | 54.4 |
| 0.15 | 94.9 | 0.15 | 82.5 |
| 0.088 | 95.8 | 0.1 | 99.1 |
| 0.06 | 97.5 | | |

The two components were then ground in the closed-circuit grinding mill shown in FIG. 1.

The mill was ball type. The ball size and distribution were as follows: φ40 mm=20%, φ15 mm=70%, φ10 mm=10%.

The percent volume of balls in the mill was 33% and the power rating was 4 kW.

The material to be ground was taken from a hopper and fed to the ball mill by means of a vibrating pipeline. The product leaving the mill went to an air classifier, where the desired fraction was separated from the coarser fraction, which was recycled to the mill.

During the several trials, the power rating adsorbed by the mill was measured by a wattmeter in order to calculate the specific power consumption with regard to the obtained product. In the aforesaid grinding mill, the mixture of clinker and gypsum was ground until obtaining two degrees of fineness, corresponding to a maximum nominal diameter of 40 μm (2,640 Blaine) and, respectively, of 80 μm (2,320 Blaine). The relevant products are hereinafter denominated CLK1 and CLK2.

The fine particle fraction ranging from 0 to 10 μm in diameter was partially removed by the air classifier from product CLK1 to give product CLK3 having fineness of 1,640 Blaine.

Limestone was ground in said grinding mill until obtaining a fineness of ≈10,000 Blaine.

The products obtained were analysed by a laser apparatus SYMPATEC HELOS.

Table 2 shows the particle size distribution recorded.

TABLE 2

Percent cumulative undersize materials produced in the closed-circuit grinding mill

| CLINKER/GYPSUM | | | | LIMESTONE | |
| --- | --- | --- | --- | --- | --- |
| φ [μM] | CLK 1 % undersize | CLK 2 % undersize | CLK 3 % undersize | φ [μm] | % undersize |
| 0.90 | 2.69 | 3.04 | 1.21 | 0.90 | 9.92 |
| 1.10 | 3.89 | 4.43 | 1.74 | 1.10 | 14.78 |
| 1.30 | 5.00 | 5.73 | 2.21 | 1.30 | 19.56 |
| 1.50 | 6.03 | 6.97 | 2.63 | 1.50 | 24.22 |
| 1.80 | 7.46 | 8.7 | 3.19 | 2.60 | 30.90 |
| 2.20 | 9.19 | 10.81 | 3.81 | 3.10 | 39.12 |
| 2.60 | 10.75 | 12.75 | 4.33 | 3.70 | 46.48 |
| 3.10 | 12.54 | 14.96 | 4.86 | 4.30 | 54.40 |
| 3.70 | 14.51 | 17.39 | 5.40 | 5.00 | 62.09 |
| 4.30 | 16.34 | 19.62 | 5.89 | 6.00 | 68.02 |
| 5.00 | 18.34 | 22.05 | 6.47 | 7.50 | 73.27 |
| 6.00 | 21.03 | 25.30 | 7.43 | 9.00 | 78.89 |
| 7.50 | 24.75 | 29.83 | 9.29 | 10.50 | 85.07 |
| 9.00 | 28.22 | 34.03 | 11.72 | 12.50 | 89.79 |
| 10.50 | 31.53 | 38.00 | 14.68 | 15.00 | 93.36 |
| 12.50 | 35.78 | 42.99 | 19.30 | 18.00 | 96.30 |

TABLE 2-continued

Percent cumulative undersize materials produced in the closed-circuit grinding mill

| | CLINKER/GYPSUM | | LIMESTONE | | |
|---|---|---|---|---|---|
| φ [µM] | CLK 1 % undersize | CLK 2 % undersize | CLK 3 % undersize | φ [µm] | % undersize |
| 15.00 | 40.75 | 48.83 | 25.80 | 21.00 | 97.39 |
| 21.00 | 46.28 | 55.28 | 41.72 | 25.00 | 97.39 |
| 25.00 | 51.32 | 61.12 | 51.44 | 30.00 | 98.95 |
| 30.00 | 57.32 | 68.06 | 62.28 | 36.00 | 99.68 |
| 36.00 | 63.75 | 75.53 | 73.38 | 43.00 | 100.00 |
| 43.00 | 70.21 | 82.94 | 83.65 | 51.00 | 100.00 |
| 51.00 | 76.52 | 89.66 | 91.75 | 61.00 | 100.00 |
| 61.00 | 82.49 | 94.85 | 97.18 | 73.00 | 100.00 |
| 73.00 | 88.4 | 98.23 | 99.44 | 87.00 | 100.00 |
| 87.00 | 93.71 | 99.6 | 100 | 103.0 | 100.00 |
| 103.00 | 97.68 | 100 | 100 | 123.0 | 100.00 |
| 123.00 | 99.57 | 100 | 100 | 147.0 | 100.00 |
| 147.00 | 100.00 | 100 | 100 | | |

EXAMPLE 2

Ground clinkers prepared as per Example 1 (CLK1, CLK2 and CLK3) were mixed and homogenized with 20% and 25% by wt. calcareous filler at 10,000 Blaine (prepared as described in Example 1).

Standard mortars in compliance with UNI EN 196.1 were prepared from the cements produced by mixing, to determine the mixture compressive strength and rheological properties.

The determination of the mortar consistency (workability) was carried out by means of a jerking plate in compliance with UNI 7044.

The results obtained are shown in Table 3.

TABLE 3

Specific surface (Blaine), flow and compressive strength of the cements of the invention

| | Blaine | Flow % | Standard mortar CS (N/mm2) | | |
|---|---|---|---|---|---|
| | | | 2 days | 7 days | 28 days |
| CLK 1 | 2320 | 46.7 | 20.13 | 31.0 | 45.4 |
| CLK 1 + 20% C | 3856 | 53.9 | 24.32 | 35.3 | 45.2 |
| CLK 1 + 25% C | 4240 | 55.0 | 23.62 | 35.8 | — |
| CLK 2 | 2640 | 73.7 | 29.36 | 43.6 | 49.8 |
| CLK 2 + 20% C | 4112 | 64.5 | 27.78 | 42.0 | 49.6 |
| CLK 2 + 25% C | 4480 | 61.4 | 28.41 | 41.5 | 46.0 |
| CLK 3 | 1640 | 61.5 | 18.01 | 35.9 | 51.2 |
| CLK 3 + 20% C | 3312 | 71.2 | 23.97 | 41.4 | 51.4 |
| CLK 3 + 25% C | 3730 | 70.3 | 24.29 | 40.04 | 46.1 |

As may be inferred from Table 3, limestone filled cement develops with time the same compressive strength as the cement obtained with the same clinker but without addition of inert materials. In particular, the addition of 20% limestone increases the final resistance of cement CLK3 even at 28 days.

A really surprising feature concerns the increase in flow obtained with limestone filled cements CLK1 and CLK3 in respect of the corresponding Portland cements.

The effect of the calcareous filler is the greater, the lower the content of clinker fine particles ranging from 0 to 10 µm in diameter.

More specifically, a lower content of clinker fine particles can be made up by an addition of calcareous filler. Under said conditions, instead of exerting a diluting action, the filler appreciably increases short-term resistance without, however, worsening resistance properties at 28 days.

EXAMPLE 3

Three series of clinker and gypsum (CLK4, CLK5, CLK6) having average fineness of 2,000, 2,500 and 3,000 Blaine, respectively, were prepared substantially as described in Example 1.

Said test cements were added with limestone ground as per Example 1, at 6,000, 8,000 and 10,000 Blaine, respectively.

Standard mortars for the determination of compressive strengths were prepared as per Example 2.

The results obtained are shown in Table 4.

TABLE 4

| | Resistance Properties N/mm2 | | |
|---|---|---|---|
| Type of cement | 2 days | 7 days | 28 days |
| CLK4 | 16.0 | 27.4 | 36.0 |
| CLK4 + C 6000 | 18.4 | 31.2 | 37.5 |
| CLK4 + C 8000 | 20.3 | 32.8 | 37.9 |
| CLK4 + C 10000 | 19.0 | 32.9 | 37.8 |
| CLK5 | 20.9 | 37.1 | 45.7 |
| CLK5 + C 6000 | 21.2 | 37.2 | 46.3 |
| CLK5 + C 8000 | 23.2 | 37.8 | 46.7 |
| CLK5 + C 10000 | 23.4 | 37.7 | 46.4 |
| CLK6 | 23.7 | 39.8 | 50.2 |
| CLK6 + C 6000 | 23.0 | 36.5 | 45.3 |
| CLK6 + C 8000 | 24.2 | 36.3 | 42.8 |
| CLK6 + C 10000 | 23.3 | 36.9 | 42.5 |

As may be inferred from Table 4, the effect of limestone is the greater, the more the fineness of the clinker is below 3,000 Blaine. Furthermore, the clinker tends to produce a growing effect until fineness degrees of approx. 10,000 Blaine.

We claim:

1. Limestone filled Portland cement containing clinker as hydraulic component and optionally gypsum wherein:

a) limestone is contained in amounts ranging from 20 to 25% by weight calculated excluding gypsum weight; and b) the clinker contains particles having a fineness ranging from 1600 to 2800 Blaine, and the limestone contains particles having a fineness ranging from 6000 to 10000 Blaine.

2. A limestone filled Portland cement as claimed in claim 1, wherein the limestone particles have an average diameter up to 30 µm.

3. A limestone filled Portland cement as claimed in claim 1, wherein the clinker particle size is up to 80 µm.

4. A limestone filled Portland cement as claimed in claim 3, wherein the clinker particle size ranges from 10 to 40 µm.

5. A process for preparing a limestone filled Portland cement containing clinker as hydraulic component and optionally gypsum, wherein limestone is contained in amounts ranging from 20 to 25% by weight calculated excluding gypsum weight, said process comprising.

(a) grinding separately clinker optionally containing gypsum until obtaining a fineness ranging from 1600 to 2800 Blaine and limestone until obtaining a fineness ranging from 6000 to 10000 Blaine; and (b) homogenizing the clinker optionally containing gypsum and limestone ground separately.

6. The process as claimed in claim 5, wherein:
i) said separate grinding is carried out in a ball mill which is fed with clinker and limestone to be ground by means of a hopper;
ii) ground clinker and limestone from step i) are passed through a vibrating pipeline to an air classifier wherein a fraction having fineness ranging from 1600 to 2800 Blaine for clinker and 6000 to 10000 Blaine for limestone is separated from a coarser fraction which is returned to the ball mill; and
iii) ground clinker and limestone having said fineness are filtered through a bag filter and collected.

7. Limestone filled Portland cement containing clinker in an amount ranging from 70 to 80% based on total cement weight, and optionally gypsum, wherein:
(a) limestone is present in an amount ranging from 20 to 25% by weight based on total cement weight excluding gypsum weight; and
(b) the clinker contains particles having a fineness ranging from 1600 to 2800 Blaine and the limestone contains particles having a fineness ranging from 6000 to 10000 Blaine.

* * * * *